United States Patent [19]
Birckhead, Jr. et al.

[11] 3,745,846
[45] July 17, 1973

[54] CONVEYOR BELT CONSTRUCTION

[75] Inventors: Lennox Birckhead, Jr., Rowayton; Charles P. Evans, Trumbull; Alden W. Olsen, New Milford, all of Conn.

[73] Assignee: Vitek Research Corporation, Stamford, Conn.

[22] Filed: Oct. 14, 1971

[21] Appl. No.: 189,265

[52] U.S. Cl. .............................. 74/231 R, 156/137
[51] Int. Cl. ........................... F16g 1/00, B29h 7/22
[58] Field of Search ..................... 74/231 R, 231 M; 156/137

[56] References Cited
UNITED STATES PATENTS
3,387,500  6/1968  Huzenlaub et al. ............... 74/231 R
3,545,293  12/1970  Marzocchi et al. ............... 74/231 R
3,607,561  9/1971  Hutz et al. ....................... 156/137 X

*Primary Examiner*—Leonard H. Gerin
*Attorney*—Martin L. Faigus et al.

[57] ABSTRACT

An endless conveyor belt construction adapted to support a substantially planar substrate and adapted to convey the substrate past a powder deposition station at which a layer of particulate, thermoplastic material is applied to a surface of the substrate; and past a fusing station at which the particulate material is fused together into a self-supporting sheet. The endless conveyor belt construction includes a thermally conductive support belt which is substantially rigid under tension; a flexible, porous insulating pad having an inner surface in engagement with a surface of the support belt, and having an outer exposed surface adapted to receive the substantially planar substrate thereon; and transversely spaced elongate sealing means secured adjacent side margins of the support belt and having inner surfaces normally disposed in overlying relationship with side regions of the exposed surface of the insulating pad. Vacuum passages extend through the thermally conductive support belt in communication with the flexible, porous insulating pad.

8 Claims, 4 Drawing Figures

CONVEYOR BELT CONSTRUCTION

BACKGROUND OF THE INVENTION

1. Field of the Invention

This invention relates to a conveyor belt construction, and more specifically to a conveyor belt construction adapted to support a substantially planar substrate and to convey said substrate past a powder deposition station at which a layer of particulate, thermoplastic material is applied to the substrate; and past a fusing station at which said particulate material is fused together into a self-supporting sheet.

2. Description of the Prior Art

Self-supporting sheets made from fused, particulate, thermoplastic material are being seriously considered for use in many items of commerce. For example, such sheets are being considered as a substitute for leather in items such as upholstery, boots, shoes, handbags and the like. Also such sheets are being considered for use as swimming pool liners, wall coverings, floor coverings and other decorative surfaces.

Self-supporting sheets can be formed by depositing particulate, thermoplastic material as a layer or coating on one surface of a release paper substrate at a powder deposition station, and fusing together the particulate material defining said layer at a powder fusing station. The fused layer defines a self-supporting sheet which is removed from the release paper substrate. Release paper substrates are extremely desirable for use as molds in forming self-supporting sheets because release paper substrates having different embossed patterns thereon can be substituted easily for each other to form self-supporting sheets with different patterns imposed in a surface thereof.

Prior art conveying systems for continuously conveying a release paper substrate past a powder deposition station and a powder fusing station have included means for applying substantial tension to the release paper substrate during the fusing operation to prevent "cockling" of said substrate, i.e., wrinkling of the substrate as it dries out from the heat applied during the fusing operation. Cockling of the release paper substrate can disturb the uniformity of the layer of particulate, thermoplastic material deposited thereon, and can also impose wrinkles into the fused, self-supporting sheet. The tension applied to the release paper substrate to prevent cockling has caused the release paper substrate to tear. Furthermore, when the release paper substrate contains a pattern therein, the tension tends to pull the pattern out of said substrate. Both the tearing of the release paper substrate and the pulling of the pattern out of said substrate prevents the reuse of said substrate, or contributes to a reduction in the number of times that the substrate can be reused. Obviously, the cost of manufacturing fused, self-supporting sheets is increased as the number of times that a release paper substrate can be reused is reduced.

Prior art conveying systems have not adequately protected side edges of the release paper substrate from exposure to the heat generated during the fusing operation. The exposure of the side edges to the heat generated during the fusing operation causes said side edges to dry out at a rapid rate. When the edges dry out they crack and/or tear and thereby reduce the useful life of the release paper substrate. The side edges dry out at a rapid rate because the layer of particulate material on the release paper substrate does not normally extend over said side edges to protect them from the heat generated during the fusing operation.

Prior art conveying systems, such as rolls and metal belts, have not permitted a controlled, uniform rate of heat transfer through, and out of the layer of particulate material and the release paper substrate to prevent damage to said release paper substrate and to said layer of particulate material. When the rate of heat transfer through, and out of the layer of particulate material and the release paper substrate is too slow, the release paper substrate will tend to scorch and/or burn. When the rate of heat transfer through, and out of the layer of particulate material and the release paper substrate is too fast, the particulate material adjacent the exposed surface of the layer will be decomposed by excessive exposure to the heat generated during the fusing operation prior to the generation of sufficient heat at the interface between the release paper substrate and the layer of particulate material to cause the particulate material at said interface to wet the surface of said substrate and fuse together.

SUMMARY OF THE INVENTION

This invention is a conveyor belt construction adapted to support a substantially planar substrate and adapted to convey said substrate past a powder deposition station at which a layer of particulate, thermoplastic material is applied to a surface of said substrate; and past a fusing station at which said particulate material defining said layer is fused together into a self-supporting sheet. The conveyor belt construction of this invention has its greatest utility in supporting and conveying substantially planar substrates which have one or more of the following characteristics:

1. tend to cockle, i.e., wrinkle, as a result of the heat encountered at the fusing station, and will tend to tear, or otherwise be impaired by tension applied to the substrate to prevent such cockling;
2. have side edges which tend to tear and/or crack upon exposure to the heat generated at the fusing station; and/or
3. tend to scorch, burn, or otherwise become damaged as a result of the heat encountered at the fusing station unless a controlled, uniform rate of heat transfer can be established through, and out of the layer of particulate material and the substrate.

One substrate which has all of the above characteristics is release paper. A typical release paper substrate which can be supported and conveyed by the conveyor belt construction of this invention is sold by S. D. Warren Company, a division of Scott Paper Company, under the trademark "TRANSKOTE."

The conveyor belt construction of this invention includes a thermally conductive support belt which is substantially rigid under tension; a porous insulating pad having an inner surface in engagement with a surface of a support belt, and having an outer exposed surface adapted to receive the substantially planar substrate thereon; and transversely spaced, elongate sealing means secured adjacent side margins of the support belt and having inner surfaces normally disposed in overlying relationship with side regions of the exposed surface of the insulating pad. Vacuum passages extend through the thermally conductive support belt and are in communication with the porous insulating pad.

A substantially planar substrate which is to receive a layer of particulate, thermoplastic material thereon is positioned on the exposed surface of the porous insulating pad with its side regions disposed between side regions of the insulating pad and the inner surfaces of the spaced sealing means. A partial vacuum is created through the vacuum passages in the thermally conductive support belt and through the porous insulating pad to retain firmly the substantially planar substrate in intimate and uniform contact with the exposed surface of the insulating pad. The conveyor belt construction with the substantially planar substrate supported thereon is then adapted to be directed past powder deposition and powder fusing stations.

In the most preferred embodiment of this invention, the conveyor belt construction is endless and is disposed about spaced support means, such as rolls or pulleys, to define a coating run and a return run. The substantially planar substrate is positioned on the exposed surface of the insulating pad at an upstream end of the coating run adjacent one of the spaced rolls or pulleys whereat the sealing means are continuously moved out of overlying relationship with the insulating pad to permit side regions of the substantially planar substrate to be positioned in underlying relationship with the inner surfaces of the sealing means when said sealing means are permitted to return to their normal position in overlying relationship with the insulating pad. The substantially planar substrate can be separated from the conveyor belt construction at the downstream end of the coating run adjacent the other pulley, or at the downstream end of the return run to permit additional time for cooling the conveyor belt construction and the fused layer thereon prior to removal of the fused layer from said conveyor belt construction.

Since the thermally conductive support belt of the endless conveyor belt is substantially rigid under tension it will resist the tension forces applied by the spaced pulleys to prevent distortion of the conveyor belt construction. Also, the support belt prevents the application of excessive tension forces to the substantially planar substrate to prevent tearing of said substrate. Furthermore, when the substrate has a pattern therein the support belt prevents the application of excessive tension forces to said substrate to prevent said pattern from being pulled out of said substrate.

The application of a partial vacuum through the thermally conductive support belt and the porous insulating pad firmly retains the substantially planar substrate against the exposed surface of the insulating pad. This method of retaining the substrate against the insulating pad aids in preventing cockling of said substrate without the necessity of applying tension forces thereto.

The transversely spaced, elongate sealing strips aid in maintaining the side regions of the substantially planar substrate against the insulating pad to aid in preventing cockling of said side regions during the fusing operation. Furthermore, these sealing strips protect the side edges of the substrate from the heat generated during the fusing operation to prevent the side edges from drying out at a rapid rate, and thereby cracking and/or tearing. Preferably, the sealing strips are secured directly to the thermally conductive support belt to define a closed vacuum region between the sealing strips and support belt to assure that the partial vacuum applied through the vacuum passages in the support belt will be maintained at a sufficient level to retain the substrate in intimate and uniform contact with the exposed surface of the porous insulating pad. Intimate and uniform contact must be maintained between a substrate such as release paper and the porous insulating pad to permit the controlled, uniform rate of heat transfer through and out of the layer of particulate material and the substrate to prevent scorching and/or burning of said substrate. Also, a controlled, uniform rate of heat transfer often is required to prevent exposure of the particulate material adjacent the exposed surface of the layer to excessive heat, which can decompose the particulate material of said exposed surface, prior to the generation of sufficient heat at the interface between the substrate and the layer of particulate material to cause the particulate material adjacent said substrate to wet the substrate surface and to fuse together.

DESCRIPTION OF THE PREFERRED
EMBODIMENT OF THE INVENTION

Figure 1:
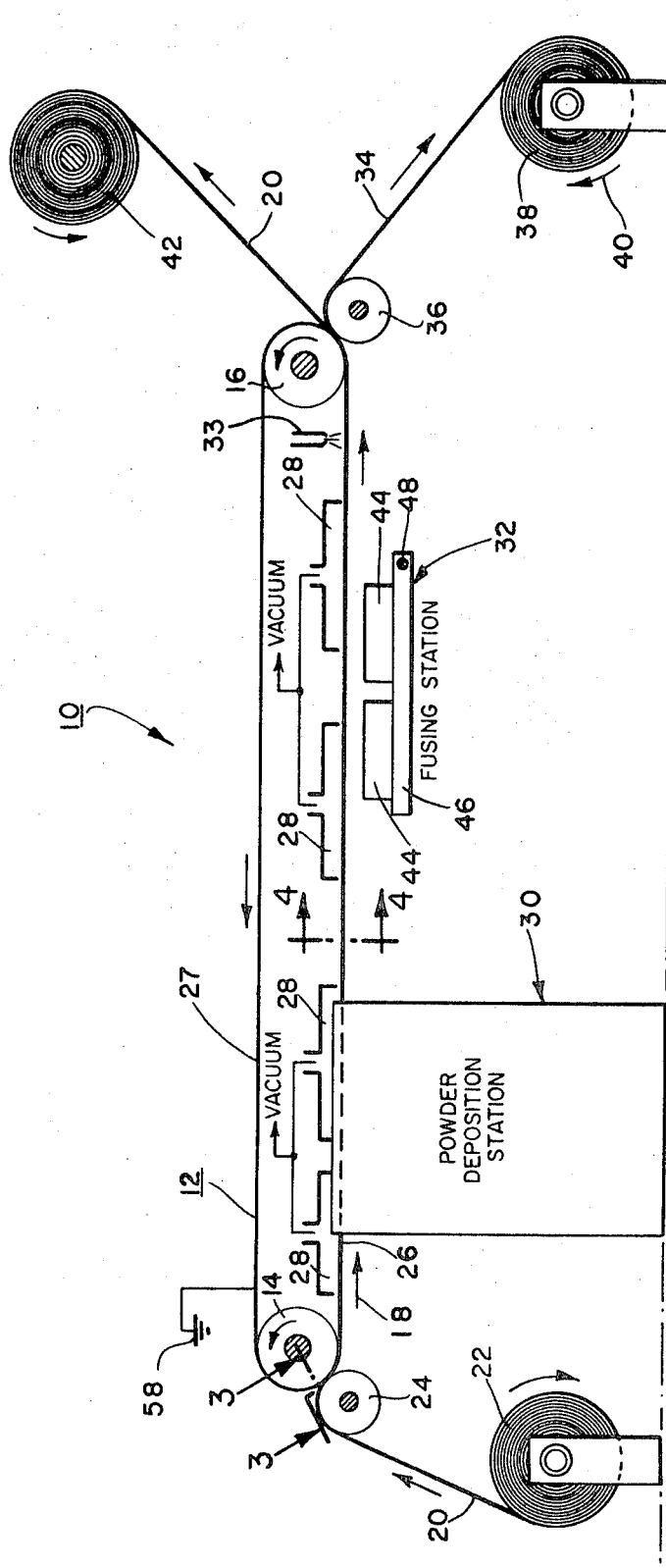
FIG. 1 is a schematic elevation view of a powder deposition system in which the conveyor belt construction of this invention can be utilized.

Referring to FIG. 1, a powder deposition system 10 employs a conveyor belt construction 12 according to this invention. The conveyor belt construction 12 preferably is endless, and is disposed about spaced support means, such as rolls or pulleys 14 and 16, one of which is driven by conventional drive means (not shown) to drive the conveyor belt construction in the direction indicated by arrow 18. A substantially planar substrate 20, which can be a release paper substrate, is fed from a supply roll 22 over a guide roll 24 into engagement with a lower coating run 26 of the endless conveyor belt construction 12. The substrate 20 is retained in intimate and uniform engagement with the endless conveyor belt construction 12 by the application of a partial vacuum through a plurality of vacuum shoes 28 which are connected to a suitable source of vacuum, as is schematically indicated in FIG. 1, and as will be described more fully hereinafter. The substrate 20 is directed through a powder deposition station 30 at which a layer 31 (FIG. 4) of particulate, thermoplastic material is deposited thereon. The substrate 20 with the layer 31 thereon is directed past a fusing station 32 at which the particulate material defining the layer 31 is fused together. The fused layer is directed past a coating station 33, which may comprise water spray nozzles, to cool the fused layer to form a self-supporting sheet 34. When the substrate 20 is release paper, the sheet 34 can be separated therefrom at a take-off roll 36, at the downstream end of the coating run 26, or at a similar take-off roll (not shown) at the downstream end of return run 27 adjacent pulley 14. The sheet 34 is directed to a storage roll 38 which is positively driven by conventional drive means (not shown) in the direction indicated by arrow 40. The release paper substrate 20 is directed to a positively driven rewind roll 42 for storage and/or subsequent use. A similar storage roll and rewind roll would be provided adjacent the downstream end of the return 27 if separation is effected thereat.

The powder deposition station 30 does not form a part of the present invention and can include any suitable system for applying particulate, thermoplastic material onto a substrate. Representative systems are disclosed in U.S. Pat. Nos. 3,263,127, issued July 26, 1966; 3,323,934, issued June 6, 1967 and 3,336,903, issued Aug. 22, 1967. When the powder deposition station 30 is of the electrostatic type, the conveyor belt construction is grounded, as is indicated at 58.

The fusing station 32 also include any suitable source for applying heat to the layer of particulate, thermoplastic material to fuse said particulate material into a self-supporting sheet. Preferably, the fusing station includes radiant heaters 44 which direct infrared radiation to the coated substrate from only the coated side thereof. The radiant heaters 44 are mounted on a support member 46 that is pivotally adjustable about axle 48 by any conventional drive system (not shown) to permit adjustment of the radiant heaters.

The conveyor belt construction 12 of this invention can be utilized in any suitable powder deposition system. The preceding description is intended to exemplify one preferred powder deposition system 10 to provide a clearer understanding of the most preferred use of the conveyor belt construction 12 of this invention.

Figure 2:
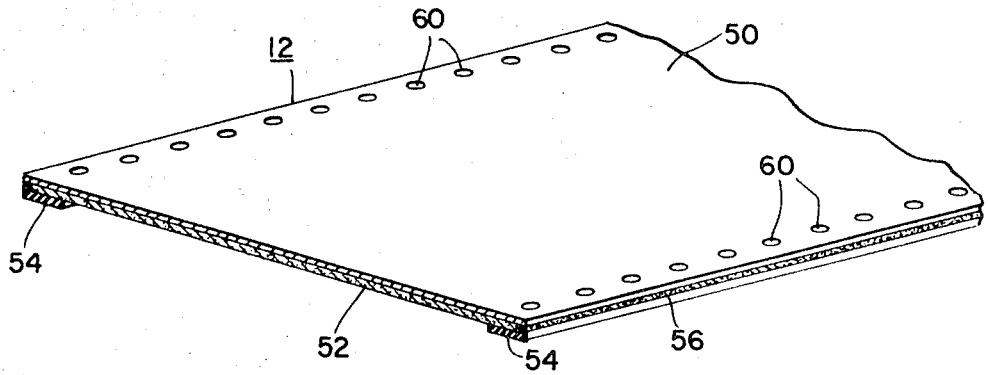
FIG. 2 is a fragmentary dimetric view of the conveyor belt construction of this invention.
Figure 4:
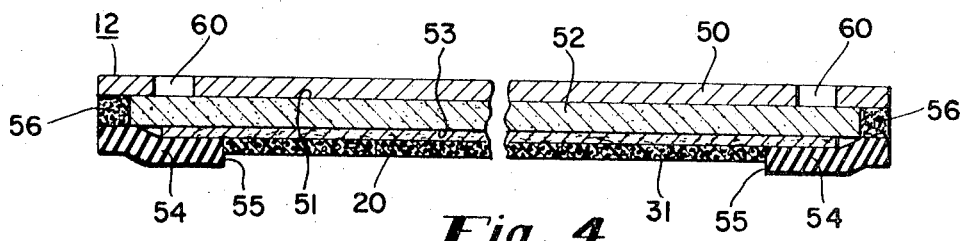
FIG. 4 is a sectional view along line 4—4 of FIG. 1.
Figure 3:
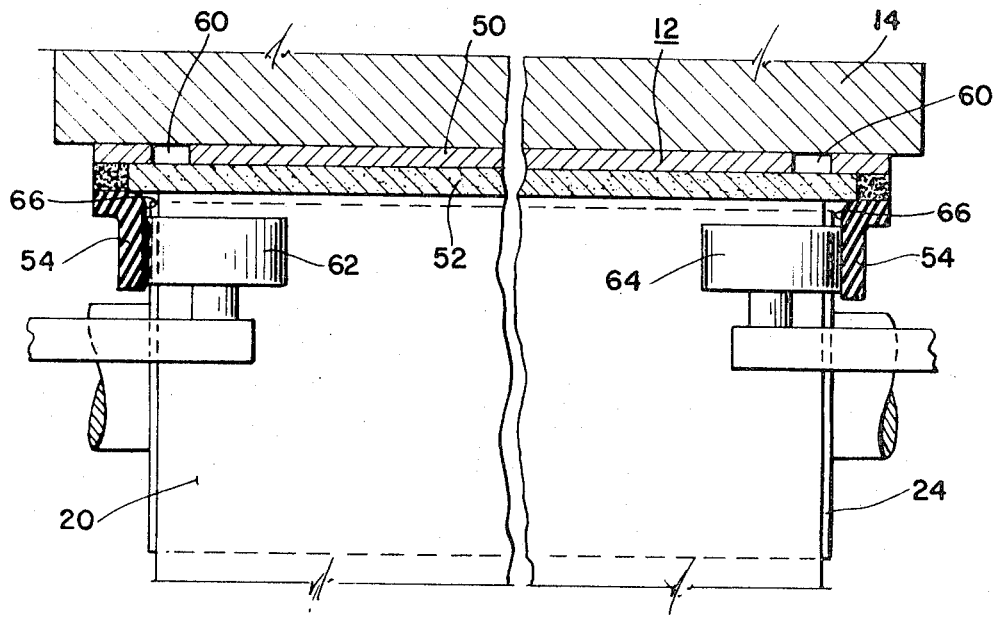
FIG. 3 is a sectional view along line 3—3 of FIG. 1.

Referring to FIGS. 2 through 4, the endless conveyor belt construction 12 of this invention includes a thermally conductive support belt 50, a porous insulating pad 52 and transversely spaced, elongate sealing strips 54. The thermally conductive support belt 50 is substantially rigid under tension to provide stiffness to the conveyor belt construction 12 to prevent distortion thereof which would otherwise occur as a result of the tension forces applied thereto through the spaced pulleys 14 and 16. The thermally conductive support belt 50 has a sufficiently high thermal conductivity to function as a heat sink during the preferred fusing method disclosed hereinbefore which is the invention of Lennox Birckhead, Jr. and Alden W. Olsen. This invention is covered in U.S. Pat. application Ser. No. 189,293, filed on even date, titled, METHOD OF FUSING TOGETHER PARTICULATE, THERMOPLASTIC MATERIAL ON A RELEASE PAPER SUBSTRATE, which is hereby incorporated by reference. The support belt is electrically conductive to function as a ground when the conveyor belt construction 12 is utilized in an electrostatic powder deposition system. Preferably, the thermally conductive support member is a stainless steel belt having a thickness of between 30 to 50 mils. Stainless steel is preferred because it will not corrode under the conditions encountered during the fusing operation; however, other thermally conductive materials having the required properties set forth above are contemplated for use in the conveyor belt construction 12 of this invention.

The porous insulating pad 52 has an inner surface 51 in engagment with a surface of the support belt 50, and an outer exposed surface 53 for receiving the substrate 20 thereon. The specific insulating materials utilized to form the insulating pad must be stable, i.e., must not melt or decompose, under the temperature conditions employed during the fusing operation. Preferably, the insulating materials have a conductivity factor in the range of from about 0.01 to about 0.1 BTU/(hr.) (sq. ft.) (°F/ft.) under the temperature conditions employed during the fusing operation. Insulating materials within the above conductivity range permit a sufficiently slow rate of heat transfer through the substrate 20 to permit contiguous surfaces of the release substrate and the layer of particulate material to be brought up to a sufficiently high temperature to cause the particulate material to wet the substrate and fuse together without heating the particulate material adjacent the opposite, exposed surface of the layer 31 so excessively as to decompose the particulate material adjacent said exposed surface. Asbestos, cotton wool, hair felt, and nylon are examples of insulating materials which can be utilized in the insulating pad 52. In the most preferred embodiment of this invention the insulating pad 52 has a thickness in the range of from about one-sixteenth inch to about one-half inch, and is comprised of a high-temperature nylon sold by Dupont Company under the trademark "NOMEX." Preferably, the insulating pad is flexible to permit contiguous surfaces of the insulating pad 52 and the substrate 20 to conform to each other to thereby aid in establishing intimate and uniform contact between said substrate and said insulating pad when the substrate 20 is retained against the exposed surface 53 of the insulating pad 52 in a manner which will be subsequently described.

Vacuum ports 60 are disposed through the support belt 50 in rows adjacent each marginal edge thereof, and in communication with the porous insulating pad 52. A partial vacuum is applied through the vacuum ports 60 through vacuum shoes 28 (FIG. 1) which are fixed against movement to suitable frame members (not shown). In operation, the support belt 50 is fed in sliding engagement with the vacuum shoes 28 along the coating run 26 so that a vacuum is continuously applied through the vacuum port 60 and therefore, through the porous insulating pad 52 to retain the release paper substrate in intimate and uniform contact with the exposed surface 53 of said insulating pad.

The transversely spaced sealing means 54 preferaly are in the form of continuous, flexible sealing strips which are cemented at 56 to the support belt 50 adjacent side margins thereof. These sealing strips have inner surfaces 66 which extend inwardly in a normally overlying relationship with side regions of the exposed surface 53 of the insulating pad. The sealing strips terminate at inner edges 55 which are spaced from each other to define an exposed central region therebetween in which the self-supporting sheet 34 is formed. By securing the insulating strips directly to the support belt 50, a closed vacuum compartment is formed to insure that the partial vacuum applied through the vacuum ports 60 will be maintained during the entire conveying operation to retain the substrate 20 in intimate and uniform contact with the insulating pad 52. Moreover, the inner surfaces 66 of the sealing strips 54 maintain side regions of the substrate 20 in engagement with the insulating pad 52 to aid in preventing cockling of said side regions. The sealing strips 54 can be of any suitable flexible, thermally insulating material which remains stable at the temperature conditions employed during the fusing operation, and in the preferred embodiment of this invention is an elastomeric material, such as silicone rubber.

The transversely spaced sealing strips 54 could be separate from the other elements of the conveyor belt construction 12, and could be maintained in contact with the support belt 50 by suitable pressure members, such as rolls or plates to form the closed vacuum compartment. The separate sealing strips 54 could be fixed against movement, in which case the support belt 50 would slide over the sealing strips; or they could be mounted in an endless fashion and rotated at the same speed as the support belt.

Referring to FIG. 3, a pair of rollers 62 and 64 are disposed adjacent the guide roll 24 at the upstream end of the endless conveyor belt construction 12. The sealing strips 54 are peeled back from the insulating pad 52 and are disposed about the peripheral surface of each of the rolls 62 and 64 to permit the substrate 20 to be fed against the exposed surface 53 of the insulating pad 52 with the side regions of said substrate disposed between said insulating pad and the inner surface 66 of the sealing strips 54 as the endless conveyor belt construction 12 moves past the guide roll 24. As the sealing strips 54 pass rollers 62 and 64 in the direction indicated by arrow 18 in FIG. 1, they return to their normal position in overlying relationship with the side regions of the insulating pad 52 to seal the side region of the substrate 20. The conveyor belt construction 12 with the substrate 20 supported thereon is then directed past the powder deposition station 30 and the fusing station 32.

What is claimed is:

1. A conveyor belt construction adapted to convey a substantially planar substrate past a powder deposition station at which a layer of particulate, thermoplastic material is supplied to said substrate; and past a fusing station at which said particulate material is fused together into a self-supporting sheet; said conveyor belt construction comprising:
    A. a thermally conductive support belt which is substantially rigid under tension for providing stiffness to said conveyor belt construction;
    B. a porous insulating pad having an inner surface in engagement with a surface of said support belt, and an outer exposed surface;
    C. passage means extending through said support belt in communication with said porous insulating pad and adapted to communicate with a source of vacuum; and
    D. transversely spaced, elongate sealing means in intimate engagement with said support belt adjacent side margins thereof, said sealing means extending inwardly toward each other and having inner surfaces in a normally overlying relationship with side regions of the outer exposed surface of the insulating pad, said sealing means terminating in spaced relationship from each other to define an exposed region therebetween.

2. The conveyor belt construction according to claim 1, wherein said elongate sealing means are secured to said support belt.

3. The conveyor belt construction according to claim 2, wherein said sealing means comprises a thermally insulating, flexible, continuous sealing strip secured adjacent each side margin of said support belt.

4. The conveyor belt construction according to claim 3, wherein said porous insulating pad has a thermal conductivity factor of from about 0.01 to about 0.1 BTU/(hr.) (sq. Ft.) (°F/ft.).

5. The conveyor belt construction according to claim 3, wherein said insulating pad is a high-temperature nylon.

6. The conveyor belt construction according to claim 3, wherein said passage means comprises rows of spaced openings extending through the thermally conductive support belt adjacent each side margin of said support belt.

7. The conveyor belt construction according to claim 3, wherein said support belt is stainless steel.

8. The conveyor belt construction according to claim 3, wherein said conveyor belt construction is endless and is disposed about spaced support means.

* * * * *